`US008734898B2`

(12) United States Patent
Meth

(10) Patent No.: US 8,734,898 B2
(45) Date of Patent: May 27, 2014

(54) METHOD FOR PRODUCING ENCAPSULATED NANOPARTICLES

(71) Applicant: E I Du Pont De Nemours and Company, Wilmington, DE (US)

(72) Inventor: Jeffrey Scott Meth, Landenberg, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/624,084

(22) Filed: Sep. 21, 2012

(65) Prior Publication Data

US 2014/0087058 A1  Mar. 27, 2014

(51) Int. Cl.
  *D04H 1/42* (2012.01)
  *C08J 3/09* (2006.01)
(52) U.S. Cl.
  USPC .............................. 427/212; 428/357; 523/332
(58) Field of Classification Search
  USPC .................... 427/212, 215; 523/332; 428/357
  See application file for complete search history.

(56) References Cited

U.S. PATENT DOCUMENTS

| | | | |
|---|---|---|---|
| 4,100,236 A | 7/1978 | Gordon et al. | |
| 5,264,553 A | 11/1993 | Hou | |
| 5,270,445 A | 12/1993 | Hou | |
| 5,358,822 A | 10/1994 | Hou | |
| 5,833,891 A | 11/1998 | Subramaniam et al. | |
| 5,874,029 A | 2/1999 | Subramaniam et al. | |
| 6,913,716 B2 | 7/2005 | Lee et al. | |
| 7,537,803 B2 | 5/2009 | Wang et al. | |
| 7,759,413 B2* | 7/2010 | Winey et al. | 523/332 |
| 2011/0229580 A1* | 9/2011 | Srivastava et al. | 424/493 |
| 2012/0128877 A1* | 5/2012 | Jain et al. | 427/213 |

FOREIGN PATENT DOCUMENTS

| | | |
|---|---|---|
| WO | 0148060 A1 | 7/2001 |
| WO | 2007133750 A2 | 11/2007 |
| WO | 2009075391 A1 | 6/2009 |

OTHER PUBLICATIONS

Eslamian et al., "Recent Advances in Nanoparticle Preparation by Spray and Microemulsion Methods", Department of Mechanical and Industrial Engineering, University of Toronto, Toronto, Canada, Recent Patents on Nanotechnology 2009, 3, pp. 99-115.*
Helmenstine, "Examples of Ionic Bonds", About.com Guide, 2013.*

* cited by examiner

*Primary Examiner* — Timothy Meeks
*Assistant Examiner* — Ann DiSarro

(57) ABSTRACT

A method is provided that produces nanocomposite materials containing well-dispersed, nanoparticles encapsulated in a polymer matrix. A feedstock comprising a colloidal dispersion of nanoparticles in a solvent and a polymer dissolved in the same solvent is passed through an ultrasonic nozzle using a flow control device, producing an aerosol of drops having diameters less than about 100 micrometers. The aerosol of drops is then mixed with a fluid that is miscible with the solvent, is a nonsolvent for the polymer, and destabilizes the colloidal dispersion. As a result, well-dispersed polymer-encapsulated nanoparticles precipitate. The method operates at atmospheric temperature and pressure and allows for independent control of the precipitation of the particle and of the polymer.

12 Claims, 2 Drawing Sheets

METHOD FOR PRODUCING ENCAPSULATED NANOPARTICLES

FIELD OF THE INVENTION

This invention relates to methods for producing nanocomposite materials, specifically, nanoparticles encapsulated in a polymer matrix.

TECHNICAL BACKGROUND OF THE INVENTION

Nanocomposites are polymers reinforced with nanometer sized particles, i.e., particles with a dimension on the order of 1 to several hundred nanometers. When nanoparticles are dispersed homogeneously throughout the polymer matrix, dramatic improvements in properties such as strength, flexural and Young's modulus, heat distortion temperature, conductivity, bioactivity, and barrier to gas permeation can be observed at very low filler loadings (<10% by weight). The nature and degree of property improvements depend in part on the geometry of the nanoparticle, its surface chemistry, and its interaction with the polymer matrix. When the nanoparticle filler is well-dispersed within the matrix, few or no nanoparticle aggregates are formed and the total surface area between the filler and the matrix is roughly equivalent to the sum of the surface areas of the individual filler particles. When the nanoparticles are not fully dispersed but are present as aggregates in the polymer matrix, optimum particle properties may not be realized.

Several techniques have been used to produce well-dispersed nanocomposites, such as precipitating small particles from a fluid dispersion using a nonsolvent (also referred to as an "antisolvent" at or near supercritical conditions; adding a solution/dispersion to a nonsolvent dropwise; using nonmiscible solvents, such that an emulsion is formed when the mixture is added to the second solvent phase; and adding a dispersion of nanoparticles in a solvent to a polymer-solvent mixture, where the solvent for the dispersion is a nonsolvent for the polymer.

Winey et al. in U.S. Pat. No. 7,759,413 disclose the preparation of nanocomposites whereby a nanofiller, such as single walled carbon nanotubes, is dispersed in a solvent; a polymer is dissolved in that same solvent; and the resulting mixture is added dropwise or all at once to a second fluid that is a nonsolvent for the polymer. Mixing with the nonsolvent occurs kinetically by interdiffusion of solvent between the two phases, and undesirable clustering of the particles can occur during this interdiffusion process.

However, to produce well-dispersed nanocomposites with a higher degree of control, it is desirable to produce smaller droplets than a standard dropper, and to have independent control of the ability to precipitate the polymer and coagulate the nanoparticle.

There remains a need for a method that produces well-dispersed nanoparticles encapsulated in a polymer matrix, operates at atmospheric temperature and pressure, and allows for independent control of the precipitation of the particle and of the polymer.

SUMMARY OF THE INVENTION

In one embodiment of the invention described herein, a process is provided comprising the steps of:
a) providing a feedstock comprising
   i) a colloidal dispersion of nanoparticles in a solvent, and
   ii) a polymer dissolved in the same solvent;
b) passing the feedstock through an ultrasonic nozzle using a flow control device, thereby producing an aerosol of drops having diameters less than about 100 micrometers;
c) mixing the aerosol of drops with a fluid that
   i) is miscible with the solvent,
   ii) is a nonsolvent for the polymer, and
   iii) destabilizes the colloidal dispersion,
   thereby causing polymer-encapsulated nanoparticles to precipitate; and
d) collecting and drying the precipitate produced in step c).

DETAILED DESCRIPTION OF THE INVENTION

Figure 1:
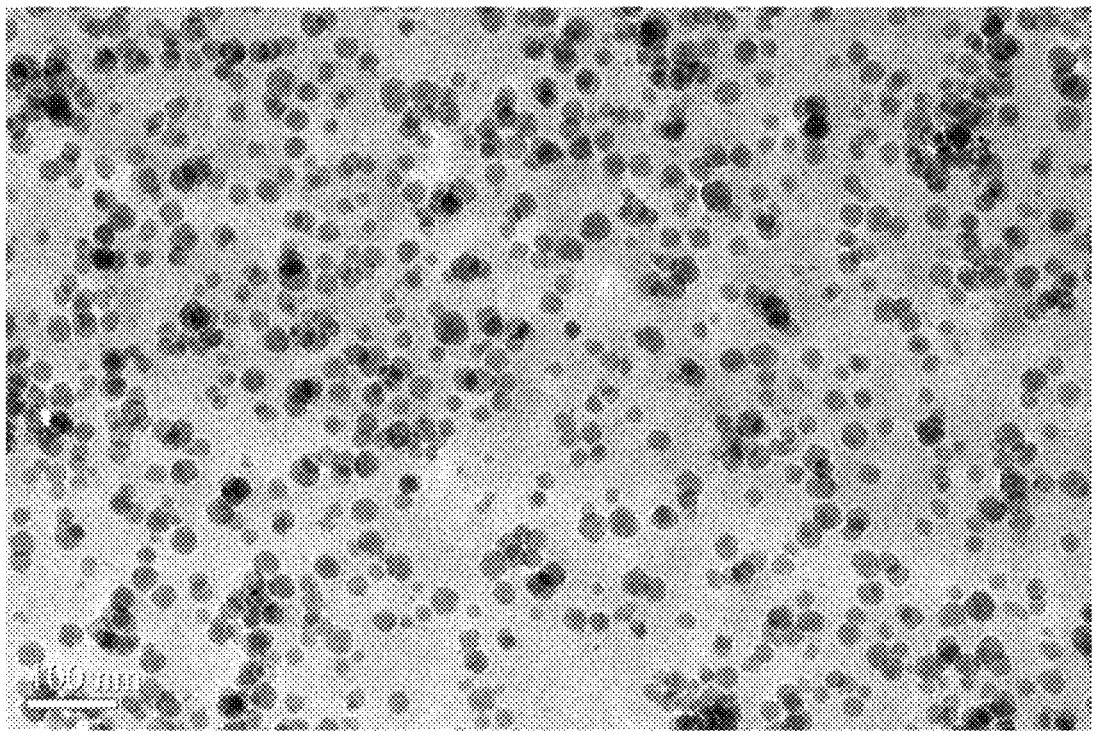
FIG. 1 is a transmission electron micrograph of a polymer nanocomposite prepared according to the present invention, containing 18.9 wt % colloidal silica.

In the context of this disclosure, a number of terms shall be utilized.

As used herein, the term "nanocomposite" or "polymer nanocomposite" means a polymeric material which contains particles, dispersed throughout the polymeric material, having at least one dimension in the 0.1 to 100 nm range ("nanoparticles"). The polymeric material in which the nanoparticles are dispersed is often referred to as the "polymer matrix."

As used herein, the term "well-dispersed" used with reference to nanoparticles encapsulated in polymer, means that the interfacial area between nanoparticles and polymer is at least approximately equal the sum of the surface areas of all the nanoparticles.

As used herein, the term "colloidal silica" or, equivalently, "colloidal silica dispersion" means a dispersion of amorphous silica particles having diameters of about 1 to about 150 nm.

As used herein, the term "charge-stabilized" means a dispersion containing charged colloidal particles whose agglomeration is inhibited by a balance of van der Waals interaction and the repulsion between the electrical double layers surrounding the charged particles (John Eastman in *Colloid Science: Principles, Methods and Applications*, Terence Cosgrove (ed.), Blackwell Publishing Ltd., (2005), p. 49).

As used herein, the term "ionic strength" ($\mu$) is defined as $$\mu = \tfrac{1}{2} \Sigma c_i z_i^2$$

where $c_i$ is the ionic concentration (e.g., in mol/L) of the ith ionic species and $z_i$ is the number of charges on that ion (Theodros Soloman, *Journal of Chemical Education*, 78(12), (2001), 1691-1692).

As used herein, the term "diffusion length" denotes the length scale L that a molecule or particle traverses in a specified time, $\tau$, which is related to that time and the diffusion coefficient D by the relationship:

$$L = \sqrt{D\tau}.$$

As used herein, the term "polar solvent" denotes any solvent that has a finite dipole moment.

The term "acidic water" refers to aqueous solvent with pH below 7.0. The term "basic water" refers to aqueous solvent with pH above 7.0.

The process disclosed herein produces fine powders of polymer-encapsulated nanoparticles wherein each nanoparticle is at least predominately surrounded by polymer.

In the process, a feedstock is provided comprising a colloidal dispersion of nanoparticles dispersed in a solvent and a polymer dissolved in the same solvent. The feedstock is passed through an ultrasonic nozzle using a flow control device, thereby producing an aerosol of drops wherein each drop has a diameter less than about 100 micrometers. The aerosol of drops is then mixed with a fluid that is miscible with the solvent; is a nonsolvent for the polymer; and destabilizes the colloidal dispersion, thereby causing polymer-encapsulated nanoparticles to precipitate. The precipitate is then collected and dried. The dried precipitate can then be subjected to known polymer processing techniques to produce nanocomposite articles with well dispersed nanoparticles.

Colloidal Dispersion

Suitable nanoparticles are those that can form a stable dispersion in a solvent. The solvent will also dissolve the polymer. In one embodiment, the dispersion is charge-stabilized. In one embodiment of a charge-stabilized dispersion, the nanoparticles comprise colloidal silica. A colloidal silica dispersion is a dispersion of amorphous silica particles having diameters of about 1 to about 150 nm. Preparation and properties of colloidal silica dispersions are described by H. E. Bergna in *Colloidal silica: fundamentals and applications* (*Surfactant science series*, v. 131), H. E. Bergna and W. O. Roberts eds., CRC Press (1996), pp. 9-35. The $SiO_2$ concentration of suitable dispersions is typically about 15 to about 50 wt % $SiO_2$. Aqueous colloidal silica dispersions are commercially available, e.g., from W. R. Grace & Company (Columbia, Md., USA), Ondeo Nalco (Naperville, Ill., USA), and Sigma-Aldrich (St. Louis, Mo., USA). In some embodiments, the $SiO_2$ concentration in the dispersion is a value and fractions thereof found between any two of the following values: 15, 20, 25, 30, 35, 40, 45, and 50 wt %. The concentration may also be one of the values found in the foregoing list.

Colloidal silica can be obtained as a dispersion in a solvent. The solvents may include, but are not limited to: water, isopropyl alcohol (IPA), methylethylketone (MEK), N,N-dimethylformamide (DMF), and N,N-dimethylacetamide (DMAC). Charge stabilization requires sufficient surface charge on the particles and so normally requires a polar solvent. In solvents that can perform as proton acceptors (i.e., Bronsted bases, such as water, alcohols, DMF, and DMAC), the colloidal silica dispersion will be charge-stabilized. The surface of colloidal silica is terminated with silanol groups, that is, Si—O—H functionality. Because of the acidic nature of the proton at the end of the silanol group, a small fraction of the silanol groups ionize in a Bronsted base solvent. The colloidal silica consequently develops a negative surface charge. This charge ensures that when two colloidal silica particles approach one another, they will experience a repulsive force, and if this repulsive force is large enough, the particles will not agglomerate. Thus, colloidal silica in a Bronsted base solvent produces a dispersion that is stable to agglomeration.

Only a small fraction of the surface groups (~1%) need to be ionized to produce this effect. Consequently, it is possible to bind other small molecules to the remaining surface of colloidal silica and still maintain charge stability. Thus, it is possible to create dispersions of colloidal silica that have, for example, optically active groups on the surface (fluorescent labels) or biologically active groups on the surface (medicines, insecticides, etc.). Such colloidal silica particles can then be encapsulated with polymer according to the process described herein to provide additional useful properties, such as time release dosing of biologically active species.

Charge-stabilized dispersions can be prepared using other nanoparticles besides colloidal silica. Examples of other suitable inorganic nanoparticles include, without limitation, aluminum oxides, fumed silica, zinc oxide, zinc oxide doped with indium and/or gallium, hafnia, zirconium oxide, tin oxide, tin oxide doped with indium and/or antimony, titanium oxide, tungsten oxides, magnesium oxides, tungsten carbides, silicon carbide, titanium carbide, boron nitrides, molybdenum disulfide, clay, carbon nanotubes, carbon black, carbon filaments, and mixtures thereof.

Furthermore, the nanoparticles could comprise proteins which are charged in aqueous solutions of the appropriate pH, and would remain charged if the aqueous dispersions of these proteins were mixed with organic solvents such as DMF. Also, the nanoparticles could comprise pharmaceutical drugs. Many drugs are isolated by gel electrophoresis. This technique works because the drugs possess charges. Thus, in solution, dispersions of these drugs will be charge stabilized and suitable for use in the process described herein.

Encapsulating Polymer

Suitable polymers are soluble in a solvent in which a stable dispersion of the nanoparticles can be formed. Because charge stabilization requires sufficient surface charge on the nanoparticles, a polar solvent is normally used. For example, polymers such as polystyrene (PS) and poly(methylmethacrylate) (PMMA) can dissolve in a polar solvent such as dimethylformamide (DMF). Polymers containing carboxylic acid functionality can dissolve in aqueous base. Such polymers include, but are not limited to, polymethacrylic acid; polyacrylic acid; copolymers of methacrylic acid with one or more of the following comononers: styrene, methylmethacrylate, methylacrylate, ethylacrylate, and other alkyl-acrylates and other alkyl-methacrylates; copolymers of acrylic acid with one or more of the following comononers: styrene, methylmethacrylate, methylacrylate, ethylacrylate, other alkyl-acrylates and other alkyl-methacrylates. For polymers such as these that dissolve in aqueous base, acidic water can be a choice for the non-solvent. When a polymer that is dissolved in aqueous base is added to acidic water, it will precipitate if the final pH of the solution is not basic. If this solution is added to neutral water, precipitation may not occur if the final pH remains basic. Still other polymers include, but are not limited to, chitosan, polyethylene imine, polylysine, and the group of polymers with amine functionality or other base functionality that can dissolve in dilute aqueous acid. Thus, one of skill in the art can readily produce a mixture that contains a solvent in which a polymer is dissolved and a nanoparticle species is dispersed.

Fluid

A fluid used in the present invention is a nonsolvent for the polymer and is miscible with the solvent in which the polymer is soluble and destabilizes the colloidal dispersion. The nonsolvent can be a different chemical species from the solvent, or it may be a similar chemical species, but with a different pH as long as the solvent is miscible in the nonsolvent. In particular, acidic water can act as a nonsolvent for a polymer dissolved in basic water. The nonsolvent may also contain a salting out agent, i.e., a dissolved salt. A dissolved salt's presence may destabilize the charge-stabilized colloidal suspension. This is a process referred to as "salting out"; resulting in agglomerated nanoparticles. Therefore, the salt, if present, should be soluble in the nonsolvent at a concentration such that the ionic strength of the combination of polymer, solvent, fluid, nanoparticles, and salt is greater than or equal to about $10^{-3}$ M. In one embodiment, the salt is sodium chloride, the fluid is water, and the water is saturated with the sodium chloride.

In some embodiments, depending on the polymer used, an aqueous dispersion of colloidal silica will be stable when the pH of the aqueous medium is between about 2 and about 12. Many commercial dispersions of colloidal silica are supplied as aqueous dispersions with pH of about 8. At a pH of about 8, it is possible to dissolve a polymer with a sufficient amount of carboxylic acid groups incorporated onto the polymer chain. Thus, one could create an aqueous mixture having a pH about 8 that contains both a charge-stabilized dispersion of colloidal silica and dissolved polymer. When this mixture is added to water or another aqueous medium having a pH about 6 to 8, there are several possible outcomes depending on the pH and the ionic strength of the resulting combined solution:

1) If the pH is less than or equal to 7 and ionic strength is less than about $10^{-3}$ M, the polymer will precipitate because the resulting aqueous solution is now acidic, and, as such, is now a nonsolvent for the polymer. Some of the nanoparticles from the dispersion will be encapsulated by polymer, and the rest of the nanoparticles will remain in the charge-stabilized dispersion.
2) If the pH is about 8 and ionic strength is greater than about $10^{-3}$ M, the colloidal dispersion will be destabilized, and the particles will agglomerate, while the polymer remains dissolved.
3) However, if the pH is less than about 7 and ionic strength is greater than about $10^{-3}$ M, the polymer will precipitate and the colloidal dispersion will be destabilized, allowing the formation of the desired polymer-encapsulated nanoparticles as a precipitate.

Precipitation Process

It is thus useful to control the polymer precipitation rate and the nanoparticle agglomeration rate independently to achieve a high yield of dispersed polymer-encapsulated nanoparticles. If the polymer precipitates, but the nanoparticles remain in the colloidal dispersion, only some of the nanoparticles will be encapsulated in polymer. When the precipitate is subsequently collected (e.g., by filtration), some of the nanoparticles will remain in the colloidal dispersion in the liquid phase. If this happens, some of the nanoparticles will be lost, reducing the yield of the process and increasing cost. Also, the weight percentage of colloidal silica in the final composite will be different from that of the formulation. This adds uncertainty to the weight percentage of filler in the nanocomposite, requiring it to be remeasured. Also, the liquid phase, which would normally become a waste stream, would require treatment to remove the remaining colloidal dispersion of nanoparticles before disposal. This is an extra process step that decreases the efficiency of the overall manufacturing process and increases cost.

An effective precipitation process, in which polymer-encapsulated dispersed nanoparticles are efficiently produced, utilizes rapid and complete mixing of the polymer/solvent/colloidal dispersion mixture with the nonsolvent fluid. The formation of the well-dispersed polymer-encapsulated nanoparticles is a kinetically controlled process. The polymer precipitation rate is proportional to the total interfacial area between the two phases, which in turn is proportional to the surface area of the drops of the dissolved polymer/solvent/colloidal dispersion mixture. Thus, by reducing the size of the drops in the process, the precipitation rate of the polymer is increased.

For example, one may precipitate one drop of radius $r_1$ with volume equal to $V_1=4/3\pi r_1^3$, and surface area equal to $SA_1=4\pi r_1^2$. If this same volume of liquid were comprised of N smaller drops of radius $r_2<r_1$, the volume of each drop would equal $V_2=4/3\pi r_2^3$, and the surface area of each drop would be $SA_2=4\pi r_2^2$. For N small drops with radius $r_2$ to have the same volume as one larger drop with radius $r_1$, the value of $N=r_1^3/r_2^3$. The ratio of the total surface areas is then $(N*SA_2)/SA_1=r_1/r_2$. The total surface area thus increases inversely with the ratio of the drop diameters. Hence, the rate of producing the polymer-encapsulated nanoparticles increases by this ratio, also.

Further, the agglomeration of the nanoparticles is controlled by how far a nanoparticle can diffuse during the precipitation process. As the precipitation rate increases, the diffusion length of the nanoparticle decreases, and thus it becomes less probable that the nanoparticle will come into contact with another nanoparticle prior to being encapsulated in the polymer, which is concurrently precipitating.

Consequently, what is most desired is rapid precipitation, which is enabled by small drop sizes. In previous common practice, the drop diameter would be around several millimeters. In an embodiment of the process described herein, an ultrasonic nozzle is employed to add the dissolved polymer/solvent/colloidal dispersion mixture to the fluid/nonsolvent, reducing the drop size from several millimeters to below 100 µm, even as low as 10 µm. As nozzle technology improves, it is conceivable that drops will be created having diameters less than 1 µm, leading to precipitation rates about 3 orders of magnitude greater than achieved with millimeter-diameter drops. For example, the use of ink jet printing heads to create such small drops is foreseeable. The use of an ultrasonic nozzle allows one to create an aerosol with high surface area. Consequently, the precipitation is fast, and the particles remain individually isolated. In an embodiment which includes a salt in the nonsolvent, destabilization of the colloidal dispersion occurs, ensuring that all the nanoparticles are removed from the liquor. In some embodiments of the process described herein, the drops have diameters found between any two of the following values: 0.5, 1, 3, 5, 10, 15, 20, 25, 30, 35, 40, 45, 50, 55, 60, 65, 70, 75, 80, 85, 90, 95, and 100 µm. The diameters also include any value found in the foregoing list.

For example, in one embodiment, when an aqueous mixture at pH about 8, containing a dissolved polymer and colloidal silica, is passed through an ultrasonic nozzle, an aerosol is created of drops having diameters approximately 15 µm. When this aerosol is passed into a stirred reservoir of acidified water at pH about 2, with a concentration of NaCl about $10^{-1}$ M, both the polymer and the colloidal silica precipitate out at about the same time. The polymer precipitates because the combined solution is acidic, and thus it is a nonsolvent for the polymer. The precipitate thereby produced comprises nanoparticles encapsulated in polymer, where the polymer-encapsulated nanoparticles are well-dispersed; i.e., the total interfacial area between particles and polymer is roughly equal to the sum of the surface areas of all the nanoparticles.

The polymer-encapsulated nanoparticles described herein are at least predominately encapsulated by polymer. In some embodiments the entire nanoparticle is encapsulated by polymer. Standard measurement techniques detect no free nanoparticles dispersed in the solution. Thus, one has efficiently dispersed and encapsulated the nanoparticles individually embedded in a polymer phase. The polymer-encapsulated nanoparticles can be used to make materials that can be subjected to additional known polymer processing techniques resulting in articles. Articles may be prepared by any means known in the art, such as, but not limited to, methods of injection molding, (co)extrusion, blow molding, thermoforming, solution casting, lamination, fiber spinning, and film blowing. The method will depend on the nature of the specific nanocomposite composition as well as the desired article.

The process described herein is not limited to aqueous compositions. In an embodiment, mix a solution of polymer, e.g., poly(methyl methacrylate) in dimethylformamide (DMF), and with a dispersion of, e.g., colloidal silica in DMF. This mixture can then be aerosolized into a suitable fluid/nonsolvent (e.g., water or another miscible nonsolvent such as an alcohol) from which the polymer-encapsulated nanocomposite particles are recovered. Some salts that can be dissolved in nonaqueous solvents as potential salting out agents include, but are not limited to, organic salts such as tetra-alkyl ammonium hexafluorophosphate and tetra-alkyl ammonium tetrafluoroborate.

In another embodiment, an ionic liquid serves as both the nonsolvent for the polymer and the salting out agent for destabilizing the charge-stabilized nanoparticle dispersion. An ionic liquid is a liquid composed of ions that is fluid below about 100° C. Examples of suitable ionic liquids include, but are not limited to: butyl-3-methylimidazolium hexafluorophosphate, 1-butyl-3-methylimidazolium 2-H-perfluoropropane sulfonate, 1-butyl-3-methylimidazolium tetrafluoroborate, 1-ethyl-3-methylimidazolium 1,1,2-trifluoro-2-(pentafluoroethoxy)-ethanesulfonate, and 1-hexyl-3-methylimidazolium hexafluorophosphate.

Applications

The process described herein can be used to produce polymer-encapsulated nanoparticles for use in nanocomposites having a variety of applications.

The ability to produce well-dispersed, polymer-encapsulated nanoparticles according to the process described herein expands the opportunity for end-use applications of nanocomposites because of the improved properties that follow from greatly improved nanoparticle dispersion. Examples of the improved properties include, without limitation: viscoelastic modulus, rheology, yield stress, creep, surface hardness, compressive strength, resistance to electrical corona, electrical resistivity, color, optical transparency, lubricity, and tribological wear.

In addition, the polymer-encapsulated nanoparticles can be used in time-release technology (also known as sustained-release, sustained-action, extended-release, time-release and timed-release). The well-dispersed nanoparticles may be bioactive (i.e., have some effect on biological processes), and the encapsulating polymer may slowly degrade in the end-use environment. Since drugs typically possess ionic charge in solution, a charge-stabilized dispersion of such drugs as bioactive nanoparticles can be formed. As the encapsulating polymer degrades, the release of the bioactive nanoparticles from the nanocomposite will occur at a uniform rate. This can be important in maintaining constant levels of a drug in the blood stream.

Where a range of numerical values is recited herein, unless otherwise stated, the range is intended to include the endpoints thereof, and all integers and fractions within the range. It is not intended that the scope of the invention be limited to the specific values recited when defining a range.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

The meaning of abbreviations is as follows: "g" means gram(s), "h" means hour(s), "mL" means milliliter(s), "$M_n$" means number average molecular weight, "$M_w$" means weight average molecular weight, "RAFT polymerization" means Reversible Addition-Fragmentation chain Transfer polymerization, "TEM" means transmission electron microscopy, and "wt %" means weight percent(age).

Methods

Transmission electron microscopy was used to assess dispersion quality.

Molecular weights were measured by gel permeation chromatography.

Preparation of Silica Dispersion

The colloidal silica was SIS6963.4 from Gelest, Inc. (Morrisville, Pa., USA), an ammonium-stabilized silica dispersed in water at pH about 8. This was diluted down with pH about 8 water to create a dispersion that was 1.1 wt % silica.

Preparation of Polymer Solution

A matrix polymer that was a styrene/acrylic acid/butyl acrylate copolymer was synthesized via reversible addition-fragmentation chain-transfer (RAFT) polymerization. The styrene/acrylic acid/butyl acrylate molar ratios were 52.8/34.4/12.8. The weight average molecular weight ($M_w$) was 34,000, and the polydispersity, $M_w/M_n$, was 1.3. A 16 wt % solution was prepared of this polymer in water wherein the pH was about 8.

Example 1

Preparation of Nanocomposite Containing 2.3 wt % Silica 3.598 g of colloidal silica dispersion prepared as described above was mixed with 10.015 grams of polymer solution prepared as described above and was loaded into a 30 mL glass syringe attached to an aerosolizer (Power supply model PS-88, Nozzle 8700-120MS, Sono-Tek Corporation, Poughkeepsie, N.Y., 12601) in order to prepare a nanocomposite containing 2.3 wt % of colloidal silica in the dried material. 500 mL of saturated NaCl salt solution with pH~1, which is a nonsolvent for the polymer, was added to a beaker and stirred with a fluoropolymer stir bar. The colloidal silica/polymer/basic water mixture was gradually added to the nonsolvent, precipitating out a nanocomposite of polymer and colloidal silica. The precipitate was collected on a 9 cm #541 Whatman filter paper. Residual NaCl was extracted by washing with boiling water. The nanocomposite was dried for 48 hours in a nitrogen box and then annealed at 150° C. in an oven with flowing nitrogen qas. The gas The polymer-encapsulated nanoparticles were highly dispersed and isolated from one another.

Example 2

Preparation of Nanocomposite Containing 4.2 wt % Silica 6.556 g of the colloidal silica dispersion prepared as described above was mixed with 10.004 g of the polymer solution prepared as described above, to create a nanocomposite with 4.2 wt % of colloidal silica in the final, dried material. This mixture was aerosolized into 700 mL of saturated NaCl salt solution with pH~0.66. The work-up procedures were performed as described in Example 1. TEM images of the dried nanocomposite sample showed highly dispersed, predominantly isolated, polymer-encapsulated nanoparticles.

Example 3

Preparation of Nanocomposite Containing 18.9 wt % Silica 24.766 grams of the colloidal silica dispersion prepared as described above was added to 7.057 grams of the polymer solution prepared as described above to create a mixture which, when processed, was to yield a nanocomposite that was 18.9 wt % colloidal silica. The aerosolization and work-up procedures were performed as described in Example 2. A representative TEM image is shown in FIG. 1, showing highly dispersed, and predominantly isolated polymer-encapsulated nanoparticles.

Example 4 (Prophetic)

Preparation of Nanocomposite Using a Non-Aqueous Polymer/Colloidal Silica Mixture 100 mL of a 10 wt % solution of polymethylmethacrylate (PMMA) in dimethylformamide (DMF) is prepared. To this solution is added 10 mL of a 20 wt % colloidal silica dispersion in DMF. The resulting solution is passed through an ultrasonic nozzle into a solution containing saturated NaCl in water. The resulting composite is collected. A TEM analysis of the sample will show encapsulated nanoparticles highly dispersed in a PMMA matrix.

Figure 2:
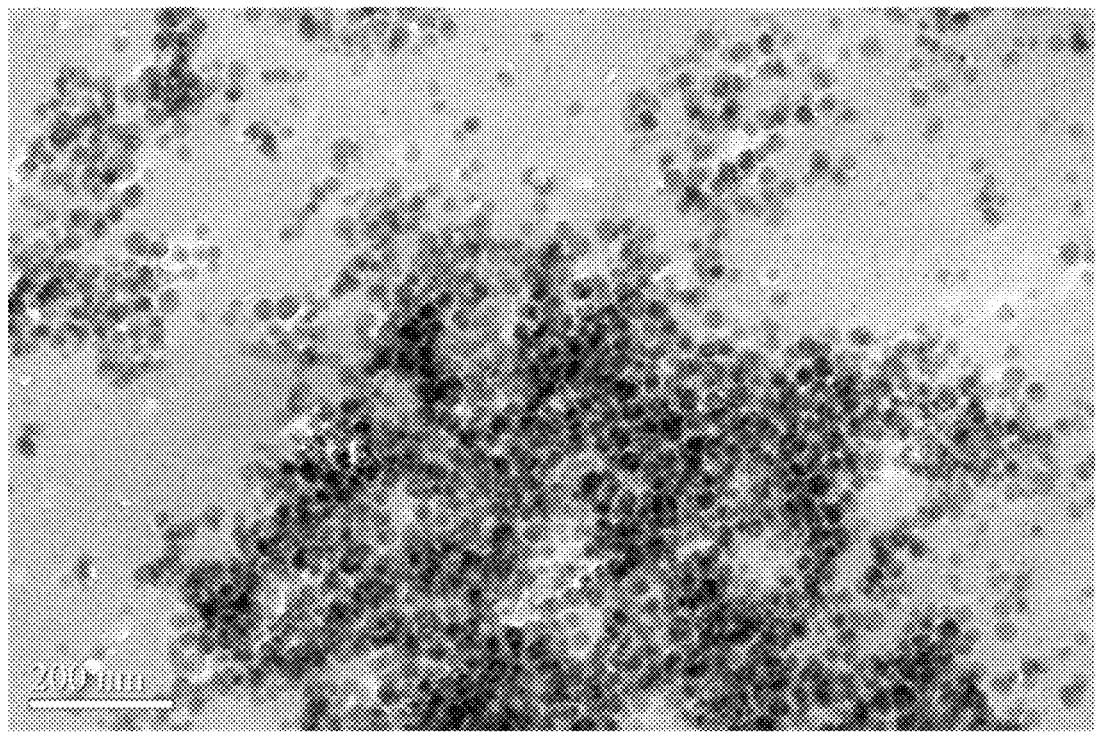
FIG. 2 is a transmission electron micrograph of a polymer nanocomposite containing 18.9 wt % colloidal silica that was not prepared according to the present invention.

Comparative Example A 18.600 g of the colloidal silica dispersion prepared as described above was added to 5.034 grams of the polymer solution prepared as described above to create a mixture which, when processed, was to yield a nanocomposite that was 18.9 wt % colloidal silica. This was aerosolized into a nonsolvent that consisted of 400 ml of NaCl saturated water plus 300 ml of deionized water, pH of 7. At this pH, the resulting solution is not a nonsolvent for the polymer, so the polymer did not precipitate. The colloidal silica did agglomerate. This is shown in the TEM image of the resultant composite that is shown in FIG. 2.

Comparative Example B (Prophetic)

100 mL of a 10 wt % solution of polymethylmethacrylate (PMMA) in dimethylformamide (DMF) is prepared. To this solution is added 10 mL of a 20 wt % colloidal silica dispersion in DMF. The formulation is dripped into the saturated NaCl using an addition funnel. The precipitate is collected. A TEM analysis of this sample will show agglomeration of the colloidal silica particles.

What is claimed is:

1. A method for producing polymer-encapsulated nanoparticles comprising the steps of:
   a) providing a feedstock comprising
      i) a colloidal dispersion of nanoparticles in a solvent, and
      ii) a polymer dissolved in the same solvent;
   b) passing the feedstock through an ultrasonic nozzle using a flow control device, thereby producing an aerosol of drops having diameters less than about 100 micrometers;
   c) mixing the aerosol of drops with a fluid that
      i) is miscible with the solvent,
      ii) is a nonsolvent for the polymer, and
      iii) destabilizes the colloidal dispersion,
      thereby causing precipitation of the nanoparticles of the feedstock encapsulated by the polymer of the feedstock, the polymer retaining its chemical identity during the precipitation and encapsulation; and
   d) collecting and drying the precipitate produced in step c).

2. The method of claim 1 wherein the drops produced in step b) have diameters between 0.5 and 20 micrometers.

3. The method of claim 1 wherein the solvent in step a) is water.

4. The method of claim 1 wherein the fluid in step c) is an aqueous saturated solution of NaCl.

5. The method of claim 1 wherein the fluid in step c) comprises an ionic liquid.

6. The method of claim 1 wherein the nanoparticles comprise colloidal silica, aluminum oxides, fumed silica, zinc oxide, zinc oxide doped with indium and/or gallium, hafnia, zirconium oxide, tin oxide, tin oxide doped with indium and/or antimony, titanium oxide, tungsten oxides, magnesium oxides, tungsten carbides, silicon carbide, titanium carbide, boron nitrides, molybdenum disulfide, clay, carbon nanotubes, carbon black, carbon filaments, or mixtures thereof.

7. The method of claim 1 wherein the nanoparticles are bioactive.

8. The method of claim 1 wherein the nanoparticles comprise protein.

9. The method of claim 7 wherein the nanoparticles comprise a drug.

10. The method of claim 1 wherein the fluid in step c) comprises an alcohol.

11. The method of claim 1 wherein the nanoparticles comprise colloidal silica.

12. A method for producing polymer-encapsulated nanoparticles comprising the steps of:
    a) providing a feedstock comprising
       i) a colloidal dispersion of nanoparticles in a solvent, and
       ii) a polymer dissolved in the same solvent;
    b) passing the feedstock through an ultrasonic nozzle using a flow control device, thereby producing an aerosol of drops having diameters less than about 100 micrometers;
    c) mixing the aerosol of drops with a fluid that
       i) is miscible with the solvent,
       ii) is a nonsolvent for the polymer, and
       iii) destabilizes the colloidal dispersion,
       thereby causing polymer-encapsulated nanoparticles to precipitate, wherein the encapsulating polymer consists essentially of the polymer provided from the feedstock; and
    d) collecting and drying the precipitate produced in step c).

* * * * *